US006657780B2

United States Patent
Choa

(10) Patent No.: US 6,657,780 B2
(45) Date of Patent: Dec. 2, 2003

(54) WIDELY TUNABLE AND INTEGRATED OPTICAL SYSTEM AND METHOD

(75) Inventor: Fow-Sen Choa, Baltimore, MD (US)

(73) Assignee: University of Maryland Baltimore County, Baltimore, MD (US)

( * ) Notice: Subject to any disclaimer, the term of this patent is extended or adjusted under 35 U.S.C. 154(b) by 114 days.

(21) Appl. No.: 10/078,255

(22) Filed: Feb. 20, 2002

(65) Prior Publication Data

US 2002/0159141 A1 Oct. 31, 2002

Related U.S. Application Data

(60) Provisional application No. 60/269,791, filed on Feb. 20, 2001.

(51) Int. Cl.[7] .............................. H01S 3/00; G02B 6/12
(52) U.S. Cl. .......................................... 359/349; 398/48
(58) Field of Search ................................ 359/344, 349; 398/48, 69; 385/14, 24

(56) References Cited

U.S. PATENT DOCUMENTS

| | | | |
|---|---|---|---|
| 5,355,237 A | * 10/1994 | Lang et al. | 359/130 |
| 5,542,010 A | 7/1996 | Glance et al. | |
| 5,633,961 A | 5/1997 | Kirkby et al. | |
| 5,701,371 A | * 12/1997 | Ishida | 359/130 |
| 6,061,156 A | 5/2000 | Takeshita et al. | |
| 6,271,949 B1 | 8/2001 | Suemura et al. | |

OTHER PUBLICATIONS

Jean–Jacques Bernard et al. "Semiconductor Optical Amplifiers"; Sep. 2001; pp. 36–38.
Jane Lam et al. "Design Trade–offs For Arrayed Waveguide Grating DWDM MUX/DEMUX".
J.H. den Besten et al. "A Dual–Phasar Multi–Wavelength Ringlaser".

* cited by examiner

*Primary Examiner*—Mark Hellner
(74) *Attorney, Agent, or Firm*—Fleshner & Kim, LLP

(57) ABSTRACT

The present invention provides tunable optical system, and a method for forming the same, that exhibits a broader tuning range with fewer components than prior art tunable optical systems. The tunable optical system of the present invention includes a plurality of wavelength routers, each having a different optical channel resolution, optically coupled to a plurality of optical amplifier arrays. The free spectral range of each of the second and subsequent wavelength routers is equal to a total bandwidth of one of its respective grating orders. The system is tuned by selectively activating optical amplifiers in each of the optical amplifier arrays. The tunable optical system of the present invention can be used to make tunable semiconductor emitters, receivers and filters.

27 Claims, 2 Drawing Sheets

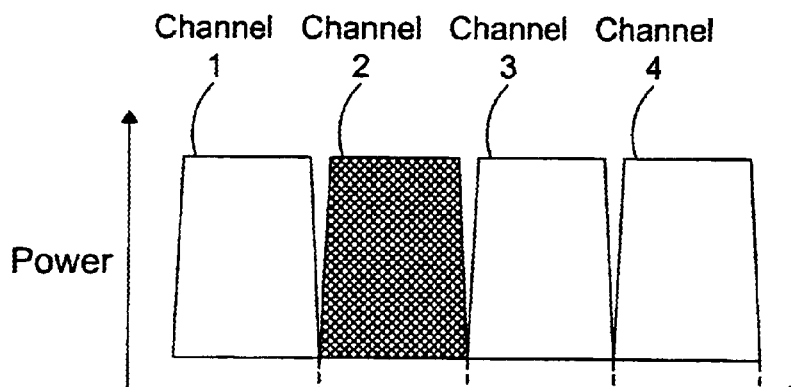
FIG. 2A (WR 110A)
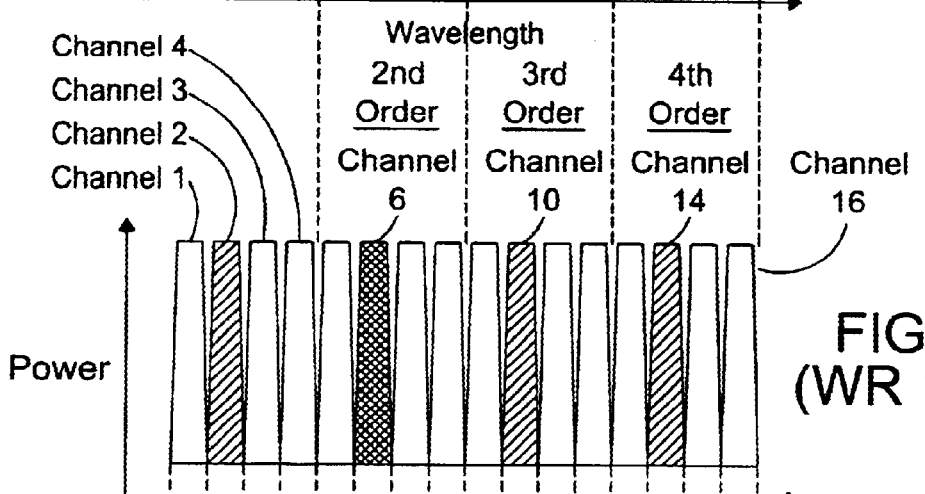
FIG. 2B (WR 110B)
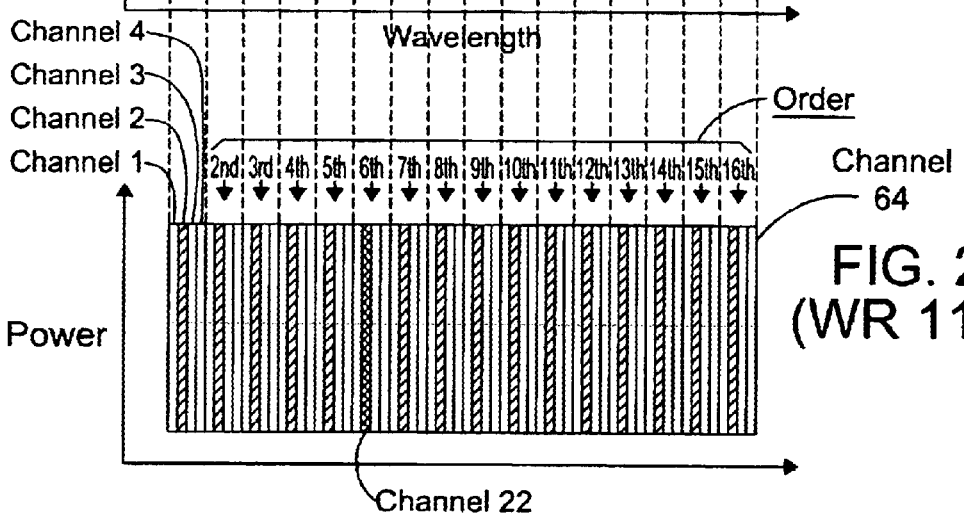
FIG. 2C (WR 110C)

WIDELY TUNABLE AND INTEGRATED OPTICAL SYSTEM AND METHOD

This application claims priority to U.S. Provisional Application No. 60/269,791, filed Feb. 20, 2001, which is hereby incorporated by reference in its entirety.

BACKGROUND OF THE INVENTION

1. Field of the Invention

This invention relates to integrated optical systems and, more particularly, to a widely tunable and integrated optical system and method that can be used to make widely tunable optical devices, such as filters, emitters and receivers.

2. Background of the Related Art

Broadly tunable optical devices, such as broadly tunable semiconductor lasers, optical filters, optical receivers, and optical wavelength monitoring are desired for various optical communication applications, such as optical networking, wavelength-division-multiplexing (WDM) and other telecommunications applications.

The tremendous growth in network traffic, primarily due to the rapid growth of the internet, is creating a need for fast tunable optical devices that can be used in optical networks, such as WDM networks. Thus, there is a continuing need for optical devices that are tunable and wavelength agile over a broad wavelength range, and that can be integrated with other devices on a common chip.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

The present invention provides tunable optical system and method that exhibits a broader tuning range with fewer components than prior art tunable optical systems. The tunable optical system of the present invention includes a plurality of wavelength routers, each having a different optical channel resolution, optically coupled to a plurality of optical amplifier arrays. The free spectral range of each of the second and subsequent wavelength routers is equal to a total bandwidth of one of its respective grating orders. The system is tuned by selectively activating optical amplifiers in each of the optical amplifier arrays. The tunable optical system of the present invention can be used to make a variety of tunable optical devices such as, for example, tunable semiconductor lasers, receivers and filters.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 2A–2C are plots that illustrate the bandpass of each of the effective channels in the first, second and third wavelength routers, respectively, shown in FIG. 1, as well as how channels are selected, in accordance with the present invention.

DETAILED DESCRIPTION OF PREFERRED EMBODIMENTS

Figure 1:
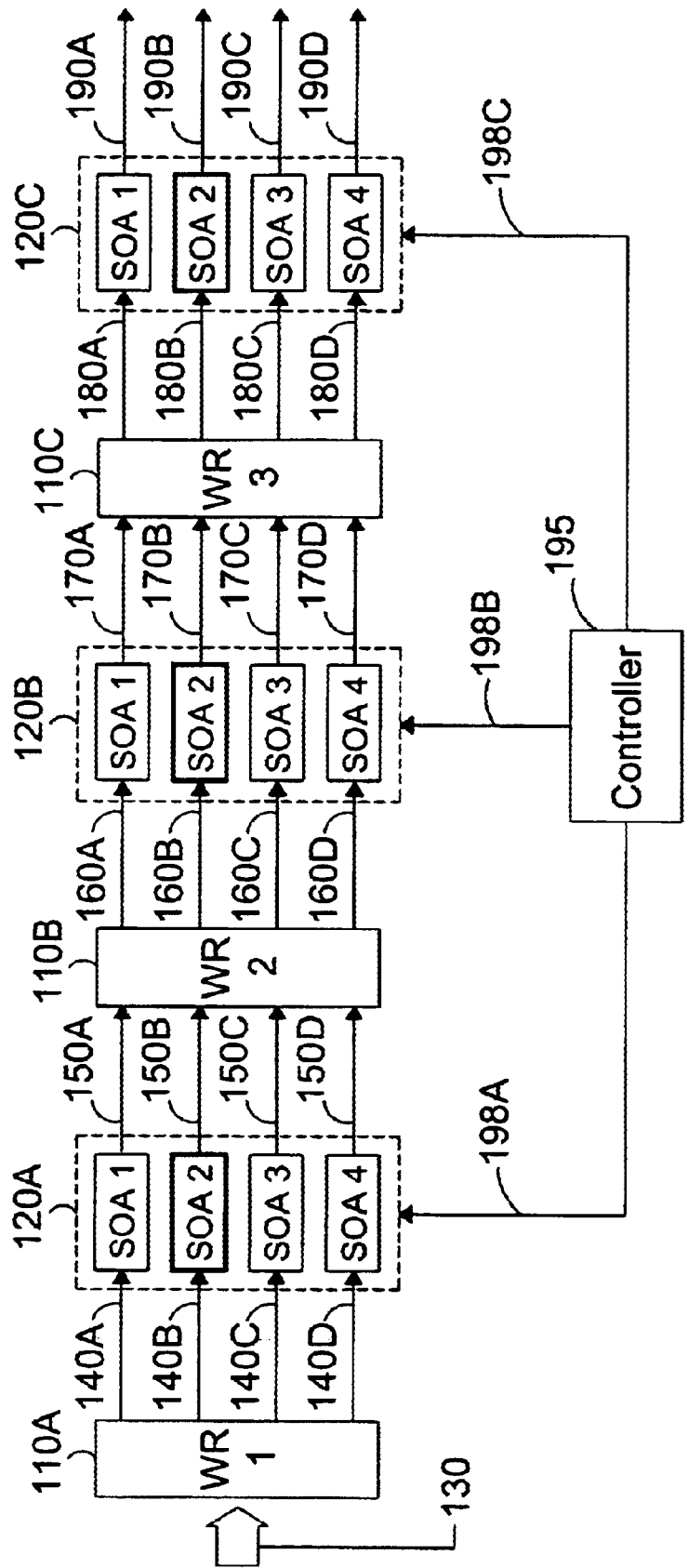
FIG. 1 is a schematic view of a widely tunable optical device 100, in accordance with one preferred embodiment of the present invention.

FIG. 1 is a schematic view of a widely tunable optical system 100, in accordance with one preferred embodiment of the present invention. The optical system 100 includes a plurality of wavelength routers (WRs) 110A–110C and a plurality of optical amplifier arrays, preferably semiconductor optical amplifier (SOA) arrays 120A–120C. Each of the SOA arrays 120A–120C include a plurality of individual SOAs. In the example shown in FIG. 1, three SOA arrays 120A–120C are used, with each SOA array having four individual SOAs, labeled SOA 1, SOA 2, SOA 3 and SOA 4.

The WRs are preferably Arrayed Waveguide Gratings (AWGs), which are generally known in the art and described in Jane Lam et al., "Design Trade-offs For Arrayed Waveguide Grating DWDM MUX/DEMUX", White Paper, Lightwave Microsystems, which is hereby incorporated by reference in its entirety. SOAs are also well known in the art and are described in Jean-Jacques Bernard et al., "Semiconductor Optical Amplifiers", SPIE's OE Magazine, September 2001, which is hereby incorporated by reference in its entirety.

In the embodiment shown in FIG. 1, each WR 110A–110C is preferably a four-channel WR with four output ports. Further, the WRs 110A–110C are designed such that the bandwidth of each channel in the first WR 110A is four times as large as the bandwidth of each channel in the second WR 110B and sixteen times as large as the bandwidth of each channel in the third WR 110C.

WRs 110B and 110C are specially designed so that their free spectral ranges are equal to the total bandwidth of one order. Thus, in the embodiment of FIG. 1, WR 110B and 110C have a free spectral range equal to the combined bandwidth of channels 1–4. With such a design, all grating orders are immediately adjacent to one another, and the last channel of one grating order is separated from the first channel of the next higher order by the same channel spacing found within each grating order. This allows one the use the higher orders of the WR as additional channels. In contrast, prior art WRs have a free spectral range such that adjacent orders are separated by an amount greater than the total bandwidth of each individual grating order.

This is illustrated in FIGS. 2A–2C, which are plots that show the bandwidth of each of the optical channels in the first, second and third WRs 110A–110C, respectively. Channels 1–4 in each of the WRs 110A–110C are all contained within one grating order. Because the free spectral range of WR 110B is equal to the combined bandwidth of channels 1–4, the second order wavelength band in WR 110B is immediately adjacent to channel 4, the third order wavelength band is immediately adjacent to the second order wavelength band, and the fourth order wavelength band is immediately adjacent to the third order wavelength band. The second order wavelength band contains channels 5–8, the third order wavelength band contains channels 9–12, and the fourth order wavelength band contains channels 13–16. Because channels 5–16 represent higher orders of the WR 110B, the channel 1 output signal of WR 110B actually contains the channel 1 wavelength band, as well as higher order channels 5, 9 and 13. Similarly, the channel 2 output signal of WR 110B contains the channel 2 wavelength band, as well as higher order channels 6, 10 and 14. The channel 3 output signal of WR 110B contains the channel 3 wavelength band, as well as higher order channels 7, 11 and 15. Finally, the channel 4 output signal of WR 110B contains the channel 4 wavelength band, as well as higher order channels 8, 12 and 16.

As shown in FIG. 2C, WR 110C operates in a similar fashion in that the free spectral range of WR 110C is equal to the combined bandwidth of channels 1–4. However, the the bandwidth of each channel in WR 110C is one-fourth of the bandwidth of each channel in WR 110B. Thus, channel 1 of WR 110B covers the same spectrum as channels 1–4 of WR 110C, channel 2 of WR 110B covers the same spectrum as the second order channels (channels 5–8) of WR 110C, channel 3 of WR 110B covers the same spectrum as the third order channels (channels 9–12) of WR 110C, etc.

The operation of the tunable optical system 100 will now be described with reference to FIGS. 1 and 2A–2C. An input broadband optical signal 130 is coupled into the first WR 110A. The first WR 110A divides the input optical signal 130 into its four optical channels 140A–140D based on wavelength, as shown in FIG. 2A. Each optical channel is then coupled into a respective SOA of the SOA array 120A via respective optical signals 140A–140D. Each of the SOAs 1–4 of SOA array 120A, when active, amplifies its respective optical signal, and outputs the amplified signal as optical signals 150A–150D, respectively, which are then coupled into the second WR 110B.

Optical signals 150A–150D respectively correspond to optical channels 1–4 of WR 110A. The second WR 110B, further divides each optical channel of WR 110A, now represented by optical signals 150A–150D, into four respective optical channels, as shown in FIG. 2B. The now sixteen optical channels are output from the second WR 110B as optical signals 160A–160D, which are then coupled into SOAs 1–4, respectively, of SOA array 120B in the manner described below.

Because each optical channel of WR 110A is divided into four respective optical channels by WR 110B, the optical signals 160A–160D together cover the sixteen optical channels of WR 110B. Specifically, as discussed above in connection with FIG. 2B, optical signal 160A includes design optical channel 1 and higher order channels 5, 9 and 13 of WR 110B, optical signal 160B includes design optical channel 2 and higher order channels 6, 10 and 14 of WR 110B, optical signal 160C includes design optical channel 3 and higher order channels 7, 11 and 15 of WR 110B, and optical signal 160D includes design optical channel 4 and higher order channels 8, 12 and 16 of WR 110B.

Each of the SOAs 1–4 of SOA array 120B, when active, amplifies its respective optical signal, and outputs the amplified optical signal as optical signals 170A–170D, respectively, which are then coupled into the third WR 110C. As discussed above, optical signals 170A–170D together cover channels 1–16 of WR 110B which, in turn, cover channels 1–4 of WR 110A. The third WR 110C further divides each of the sixteen optical channels of WR 110B into four respective optical channels, as shown in FIG. 2C. The now sixty-four optical channels are output from the third WR 110C as optical signals 180A–180D, which are then coupled into SOAs 1–4, respectively, of SOA array 120C in the manner described below.

Because each of the sixteen optical channels of WR 110B is divided into four respective optical channels by WR 110C, the optical signals 180A–180D together cover the sixty-four optical channels of WR 110C. Specifically, as discussed above in connection with FIG. 2C, optical signal 180A includes design optical channel 1 and higher order channels 5, 9, 13, 17, 21, 25, 29, 33, 37, 41, 45, 49, 53, 57 and 61 of WR 110C, optical signal 180B includes design optical channel 2 and higher order channels 6, 10, 14, 18, 22, 26, 30, 34, 38, 42, 46, 50, 54, 58 and 62 of WR 110C, optical signal 180C includes design optical channel 3 and higher order channels 7, 11, 15, 19, 23, 27, 31, 35, 39, 43, 47, 51, 55, 59 and 63 of WR 110C, and optical signal 180D includes design optical channel 4 and higher order channels 8, 12, 16, 20, 24, 28, 32, 36, 40, 44, 48, 52, 56, 60 and 64 of WR 110C. Each of the SOAs 1–4 of SOA array 120C, when active, amplifies its respective optical signal, and outputs it as optical signals 190A–190D, respectively.

The tunable optical system 100 is tuned to one of the sixty-four wavelength channels by selectively activating the individual SOAs in the SOA arrays 120A–120B. This is preferably accomplished with the use of a controller 195 that sends control signals to SOA arrays 120A–120C via signal lines 198A–198C, respectively.

For illustration, the tunable optical system 100 shown in FIG. 1 is tuned to channel 22 of sixty-four possible channels. This is accomplished by activating SOA 2 (which are shown as bold solid squares in FIG. 1) in each of the SOA arrays 120A–120C. By activating SOA 2 in SOA array 120A, channel 2 of WR 110A is amplified, while the other channels are not. The amplified channel 2 is shaded black in the plot of FIG. 2A.

Amplified channel 2 of WR 110A is then sent to WR 110B, which divides it into channels 5–8 of WR 110B, and sends channels 5–8 to SOAs 1–4, respectively, of SOA array 120B. Because only SOA 2 of SOA array 120B is activated, only the second of the four channels (channel 6 of WR 110B) is amplified by SOA array 120B, as shown by the dark shaded channel 6 in FIG. 2B. The channels in hatched shading (channels 2, 10 and 14) indicate the channels that would have been sent to and amplified by SOA 2 of SOA array 120B, if channels 1, 3 or 4 of WR 110A, respectively, had been amplified by SOA array 120A.

Amplified channel 6 of WR 110B is then sent to WR 110C, which divides it into four channels (channels 21–24 of WR 110C), and sends channels 21–24 to SOAs 1–4, respectively, of SOA array 120C. Because only SOA 2 of SOA array 120C is activated, only the second of the four channels (channel 22 of WR 110C) is amplified by SOA array 120B, as shown by the dark shaded channel 22 in FIG. 2C. The channels in hatched shading (channels 2, 6, 10, 14, 18, 26, 30, 34, 38, 42, 46, 50, 54, 58, and 62) indicate the channels that would have been sent to and amplified by SOA 2 of SOA array 120C, if different combinations of channels had been amplified by SOA arrays 120A and 120B.

The look-up table below shows which of the four SOAs in each SOA array should be activated in order to tune the tunable optical system 100 to each of the 64 different optical output channels:

| Tuned Channel | Active SOA in SOA Array 120A | Active SOA in SOA Array 120B | Active SOA in SOA Array 120C |
|---|---|---|---|
| Channel 1 | 1 | 1 | 1 |
| Channel 2 | 1 | 1 | 2 |
| Channel 3 | 1 | 1 | 3 |

-continued

| Tuned Channel | Active SOA in SOA Array 120A | Active SOA in SOA Array 120B | Active SOA in SOA Array 120C |
|---|---|---|---|
| Channel 4 | 1 | 1 | 4 |
| Channel 5 | 1 | 2 | 1 |
| Channel 6 | 1 | 2 | 2 |
| Channel 7 | 1 | 2 | 3 |
| Channel 8 | 1 | 2 | 4 |
| Channel 9 | 1 | 3 | 1 |
| Channel 10 | 1 | 3 | 2 |
| Channel 11 | 1 | 3 | 3 |
| Channel 12 | 1 | 3 | 4 |
| Channel 13 | 1 | 4 | 1 |
| Channel 14 | 1 | 4 | 2 |
| Channel 15 | 1 | 4 | 3 |
| Channel 16 | 1 | 4 | 4 |
| Channel 17 | 2 | 1 | 1 |
| Channel 18 | 2 | 1 | 2 |
| Channel 19 | 2 | 1 | 3 |
| Channel 20 | 2 | 1 | 4 |
| Channel 21 | 2 | 2 | 1 |
| Channel 22 | 2 | 2 | 2 |
| Channel 23 | 2 | 2 | 3 |
| Channel 24 | 2 | 2 | 4 |
| Channel 25 | 2 | 3 | 1 |
| Channel 26 | 2 | 3 | 2 |
| Channel 27 | 2 | 3 | 3 |
| Channel 28 | 2 | 3 | 4 |
| Channel 29 | 2 | 4 | 1 |
| Channel 30 | 2 | 4 | 2 |
| Channel 31 | 2 | 4 | 3 |
| Channel 32 | 2 | 4 | 4 |
| Channel 33 | 3 | 1 | 1 |
| Channel 34 | 3 | 1 | 2 |
| Channel 35 | 3 | 1 | 3 |
| Channel 36 | 3 | 1 | 4 |
| Channel 37 | 3 | 2 | 1 |
| Channel 38 | 3 | 2 | 2 |
| Channel 39 | 3 | 2 | 3 |
| Channel 40 | 3 | 2 | 4 |
| Channel 41 | 3 | 3 | 1 |
| Channel 42 | 3 | 3 | 2 |
| Channel 43 | 3 | 3 | 3 |
| Channel 44 | 3 | 3 | 4 |
| Channel 45 | 3 | 4 | 1 |
| Channel 46 | 3 | 4 | 2 |
| Channel 47 | 3 | 4 | 3 |
| Channel 48 | 3 | 4 | 4 |
| Channel 49 | 4 | 1 | 1 |
| Channel 50 | 4 | 1 | 2 |
| Channel 51 | 4 | 1 | 3 |
| Channel 52 | 4 | 1 | 4 |
| Channel 53 | 4 | 2 | 1 |
| Channel 54 | 4 | 2 | 2 |
| Channel 55 | 4 | 2 | 3 |
| Channel 56 | 4 | 2 | 4 |
| Channel 57 | 4 | 3 | 1 |
| Channel 58 | 4 | 3 | 2 |
| Channel 59 | 4 | 3 | 3 |
| Channel 60 | 4 | 3 | 4 |
| Channel 61 | 4 | 4 | 1 |
| Channel 62 | 4 | 4 | 2 |
| Channel 63 | 4 | 4 | 3 |
| Channel 64 | 4 | 4 | 4 |

As discussed above, the tunable optical system embodiment shown in FIG. 1 allows for tuning to one of sixty-four discreet optical channels using only twelve SOAs distributed over three SOA arrays. Prior art tunable optical systems that utilize a single 64-channel WRG, would require 64 separate SOAs, which increases the cost of the system considerably. Further, the tunable optical system of the present invention is smaller than prior art devices that require a greater number of SOAs and WRs with greater design channels (i.e., channels that lie within one grating order) to achieve the same wavelength resolution.

Although the tunable optical system 100 shown in FIG. 1 is a three-stage device, with each stage comprising a WR and an SOA array, it should be appreciated that two or more stages may be used while still falling within the scope of the present invention. In general, if the number of channels that lie within a single grating order in each WR is equal to "N", then the number of SOAs in each SOA array is also preferably set to N (i.e., the number of SOAs per SOA array is the same as the number of design channels in the first WR). The resolution of the tunable optical system is determined by the WR with the highest wavelength resolution (the narrowest channel bandwidth). The total number of effective channels is then determined by the number (X) of stages used. Specifically, the total number of output channels is given by $N^X$. Thus, in the embodiment shown in FIG. 1, N=4 (i.e., there are four design channels in each WR), and X=3 (i.e., there are three stages). Thus, the total number of output channels is 64 ($4^3$). In addition, because there are four outputs in each WR, each SOA array 120A–120B includes four SOAs (SOAs 1–4).

The WRs 110A–110C and SOA arrays 120A–120B of the tunable optical system 100 are preferably fabricated as an integrated optical circuit on a common substrate using semiconductor fabrication techniques known in the art. When fabricated as an integrated optical circuit, the optical signals 130, 140A–140D, 150A–150D, 160A–160D, 170A–170D, 180A–180D and 190A–190D are preferably guided and coupled to the appropriate components with integrated waveguides, or any other means known in the art.

The tunable optical system of the present invention may be used to make various tunable optical devices such as, for example, a tunable optical receiver, a tunable optical filter, a tunable laser, or an integrated wavelength monitoring subsystem. To use the tunable optical system of the present invention as a tunable optical receiver, the tunable optical system is anti-reflection (AR) coated at its input interface, typically the input to the first WR, and each SOA in the last SOA array is negatively biased and connected to appropriate detector circuitry so that they each function as optical detectors. The SOAs in the other SOA arrays are switched on and off, as described above, to choose the wavelength one desires to detect.

To use the tunable optical system of the present invention as a tunable filter, both the input to the first WR and the outputs of the last SOA array are preferably AR coated. Each SOA is positively biased and operated in low gain mode, when activated. The gain of each SOA, when activated, should preferably be just enough to compensate for passive losses in the waveguides that optically couple the WRs and SOA arrays together. A desired filter passband is selected by selectively activating SOAs in each SOA array, as described above.

To use the tunable optical system of the present invention as a tunable laser, it is preferable to not use any AR coatings. All SOAs are preferably positively biased and operated in high gain mode, when activated. A high reflection coating may be used at the output of the last SOA array in order to increase output power. A lasing wavelength is selected by selectively activating SOAs in each SOA array, as described above.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. For example, although the preferred embodiment of the present invention utilizes AWGs for the wavelength routers and SOAs for the optical amplifiers, other types of wavelength routers and optical amplifiers may be used while still falling within the scope of the present invention. In the claims, means-plus-function clauses are intended to cover the structures described herein as performing the recited function and not only structural equivalents but also equivalent structures.

What is claimed is:

1. A tunable optical system, comprising:
   at least first and second optically coupled stages, wherein each stage comprises,
      a wavelength router, and
      An optical amplifier array optically coupled to the wavelength router;
   wherein, when each stage is sequentially numbered from an input side, the wavelength router in the first stage comprises N effective optical channels, the wavelength router in the second stage comprises $N^2$ effective optical channels, and each wavelength router in each subsequent stage comprises $N^X$ effective optical channels, where X is the sequential stage number.

2. The tunable optical system of claim 1, wherein each wavelength touter comprises an arrayed waveguide grating (AWG).

3. The tunable optical system of claim 1, wherein each optical amplifier array comprises a semiconductor optical amplifier (SOA) array.

4. The tunable optical system of claim 1, wherein the optical amplifier array in each stage comprises N optical amplifiers.

5. The tunable optical system of claim 1, wherein, for each wavelength router, a number of optical channels that lie within a single grating order is equal to N.

6. The tunable optical system of claim 1, wherein the wavelength routers and the optical amplifiers are integrated on a common substrate.

7. The tunable optical system of claim 6, wherein the stages are optically coupled with waveguides.

8. The tunable optical system of claim 1, wherein, for each stage, the optical channels in the wavelength router are equally distributed among the optical amplifiers.

9. The tunable optical system of claim 1, wherein a total number of output channels of the tunable optical system is $N^Y$, where Y is a total number of stages, and the wavelength routers and optical amplifiers are optically coupled such that the tunable optical system may be tuned to one of the $N^Y$ channels by selectively activating at least one of the optical amplifiers in each stage.

10. The tunable optical system of claim 1, wherein each of the second and subsequent wavelength routers has a free spectral range that is equal to a total bandwidth of one of its respective grating orders.

11. A tunable laser comprising the tunable optical system of claim 1.

12. A tunable optical filter comprising the tunable optical system of claim 1.

13. A tunable optical system, comprising:
   a first stage, comprising,
      a first wavelength router comprising N effective optical channels, and
      a first optical amplifier array comprising N optical amplifiers that are each optically coupled to the wavelength router;
   a second stage, optically coupled to the first stage, comprising,
      a second wavelength router comprising $N^2$ effective optical channels, and
      a second optical amplifier array comprising N optical amplifiers that are each optically coupled to the second wavelength router; and
   a third stage, optically coupled to the second stage, comprising,
      a third wavelength router comprising $N^3$ effective optical channels, and
      a third optical amplifier array comprising N optical amplifiers that are each optically coupled to the third wavelength router.

14. The tunable optical system of claim 13, wherein N=4.

15. The tunable optical system of claim 14, wherein each of the second and third wavelength routers has a free spectral range that is equal to a total bandwidth of one of its respective grating orders.

16. The tunable optical system of claim 14, wherein optical channels 1–4 of the first wavelength router are coupled to first, second, third and fourth optical amplifiers in the first optical amplifier array, respectively.

17. The tunable optical system of claim 16, wherein:
   optical channels 1, 5, 9 and 13 of the second wavelength router are coupled to a first optical amplifier in the second optical amplifier array;
   optical channels 2, 6, 10 and 14 of the second wavelength router are coupled to a second optical amplifier in the second optical amplifier array;
   optical channels 3, 7, 11 and 15 of the second wavelength router are coupled to a third optical amplifier in the second optical amplifier array; and
   optical channels 4, 8, 12 and 16 of the second wavelength router are coupled to a fourth optical amplifier in the second optical amplifier array.

18. The tunable optical system of claim 17, wherein:
   optical channels 1, 5, 9, 13, 17, 21, 25, 29, 33, 37, 41, 45, 49, 53, 57 and 61 of the third wavelength router are coupled to a first optical amplifier in the third optical amplifier array;
   optical channels 2, 6, 10, 14, 18, 22, 26, 30, 34, 38, 42, 46, 50, 54, 58 and 62 of the third wavelength router are coupled to a second optical amplifier in the third optical amplifier array;
   optical channels 3, 7, 11, 15, 19, 23, 27, 31, 35, 39, 43, 47, 51, 55, 59 and 63 of the third wavelength router are coupled to a third optical amplifier in the third optical amplifier array; and
   optical channels 4, 8, 12, 16, 20, 24, 28, 32, 36, 40, 44, 48, 52, 56, 60 and 64 of the third wavelength router are coupled to a fourth optical amplifier in the third optical amplifier array.

19. The tunable optical system of claim 13, wherein the first, second, third and fourth wavelength routers each comprise an arrayed waveguide grating.

20. The tunable optical system of claim 13, wherein the first, second, third and fourth optical amplifiers each comprise a semiconductor optical amplifier.

21. The tunable optical filter of claim 13, wherein the wavelength routers and the optical amplifier arrays are integrated on a common substrate.

22. The tunable optical filter of claim 21, wherein the first, second and third stages are optically coupled with waveguides.

23. A method of wavelength tuning an optical system, comprising the steps of:
   dividing an input optical signal into a first plurality of optical channels based on wavelength, wherein each of the plurality of optical channels has a first bandwidth;

selectively amplifying one or more of the first plurality of optical channels;

further dividing the amplified optical channels into a second plurality of optical channels based on wavelength, wherein each of the second plurality of optical channels has a second bandwidth that is smaller than the first bandwidth; and selectively amplifying one or more of the second plurality of optical channels.

24. The method of claim 23, wherein one or more of the first plurality of optical channels are amplified by:

coupling the first plurality of optical channels into a first optical amplifier array; and selectively activating one or more optical amplifiers in the first optical amplifier array.

25. The method of claim 24, wherein one or more of the second plurality of optical channels are amplified by:

coupling the second plurality of optical channels into a second optical amplifier array; and selectively activating one or more optical amplifiers in the second optical amplifier array.

26. The method of claim 25, wherein the first and second optical amplifier arrays each comprise a common number of optical amplifiers.

27. The method of claim 23, wherein the amplified optical channels are further divided into a second plurality of optical channels with an arrayed waveguide grating that has a free spectral range equal to a total bandwidth of one of its grating orders.

* * * * *